(12) United States Patent
Gou et al.

(10) Patent No.: US 11,042,814 B2
(45) Date of Patent: Jun. 22, 2021

(54) MIXED-INITIATIVE MACHINE LEARNING SYSTEMS AND METHODS FOR DETERMINING SEGMENTATIONS

(71) Applicant: Visa International Service Association, San Francisco, CA (US)

(72) Inventors: Liang Gou, San Jose, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 1133 days.

(21) Appl. No.: 15/462,675

(22) Filed: Mar. 17, 2017

(65) Prior Publication Data

US 2018/0268319 A1    Sep. 20, 2018

(51) Int. Cl.
  *G06N 20/00* (2019.01)
  *G06N 5/04* (2006.01)
  *G06Q 30/02* (2012.01)

(52) U.S. Cl.
  CPC .............. *G06N 20/00* (2019.01); *G06N 5/04* (2013.01); *G06Q 30/0204* (2013.01)

(58) Field of Classification Search
  CPC ....... G06N 20/00; G06N 5/04; G06Q 30/0204
  See application file for complete search history.

(56) References Cited

U.S. PATENT DOCUMENTS

2005/0197954 A1* 9/2005 Maitland ................ G06Q 20/10
                                                              705/39
2007/0094067 A1* 4/2007 Kumar ............... G06Q 30/0204
                                                             705/26.2
2014/0067679 A1* 3/2014 O'Reilly .......... G06Q 20/40145
                                                              705/44
2014/0101580 A1* 4/2014 Shen ..................... G06F 16/34
                                                             715/764
2016/0012465 A1* 1/2016 Sharp ................... G06Q 20/386
                                                            705/14.17

OTHER PUBLICATIONS

Salehinejad, Hojjat, and Shahryar Rahnamayan. "Customer shopping pattern prediction: A recurrent neural network approach." In 2016 IEEE Symposium Series on Computational Intelligence (SSCI), pp. 1-6. IEEE. (Year: 2016).*

(Continued)

*Primary Examiner* — Kamran Afshar
*Assistant Examiner* — Urmana Islam
(74) *Attorney, Agent, or Firm* — Kilpatrick Townsend & Stockton LLP

(57) ABSTRACT

A computer system can perform a semi-supervised machine learning processes to cluster a plurality of entities within a population based on their features and associated labels. The computer system can generate visualization data representing the clusters of entities and associated labels for displaying on a user interface. A user can review the clustering of entities and use the user interface to add or modify the labels associated with a particular entity or set of entities. The computer system can use the user's feedback to update the labels and then re-determine the clustering of entities using the semi-supervised machine learning process with the updated labels as input. As such, the computer system can use the user's feedback to improve the accuracy of the machine learning model without requiring a larger amount of labeled input data.

20 Claims, 6 Drawing Sheets

(56) References Cited

OTHER PUBLICATIONS

Wells, William D., "Psychographics: A Critical Review." *Journal of Marketing Research* (1975), pp. 196-213.
Mikolov, T., and Dean, J.. "Distributed Representations of Wrds and Phrases and Their Compositionality." *Advances in Neural Information Processing Systems* (2013), pp. 1-9.
Vincent, Pascal, et al. "Stacked Denoising Autoencoders: Learning Useful Representations in a Deep Network With a Local Denoising Criterion", *Journal of Machine Learning Research*, Dec. 11, 2010, pp. 3371-3408.
Maaten, Laurens van der, and Geoffrey Hinton. "Visualizing Data using t-SNE.", *Journal of Machine Learning Research 9.*, Nov. 2008, pp. 2579-2605.
Cheng, Yizong, and Church, George M., "Biclustering of Expression Data." *ISMB*. vol. 8. 2000, pp. 93-103.
Rasmus, A.; Valpola, H.; Honkala, M.; Berglund, M.; and Raiko, T. (2015). "Semi-Supervised Learning with Ladder Networks" arXiv:1507.02672 [Cs, Stat]. Retrieved from http://arxiv.org/abs/ 19 pages.
Dutta, Saibal; Bhattacharya, Sujoy, and Guin, Kalyan Kumar. "Data Mining in Market Segmentation: A Literature Review and Suggestions." *Proceedings of Fourth International Conference on Soft Computing for Problem Solving*. Springer India, 2015, pp. 87-98.
Wan Lunjun et al., "Collaborative Active and Semisupervised Learning for Hyperspectral Remote Sensing Image Classification," IEEE Transactions on Geoscience and Remote Sensing, IEEE Service Center, Piscataway, NJ, US, vol. 53, No. 5, May 1, 2015, pp. 2384-2396, XP011569084, ISS: 0196-2892, DOI: 10.1109/TGRS. 2014.2359933, retrieved on Jan. 6, 2015, abstract, the whole document.
International Search Report and Written Opinion, dated Jun. 11, 2018, in International Application No. PCT/US2018/022727, 12 pages.

\* cited by examiner

MIXED-INITIATIVE MACHINE LEARNING SYSTEMS AND METHODS FOR DETERMINING SEGMENTATIONS

BACKGROUND

Segmentation can used to divide various entities within a broad population such that the entities within a particular segment have similar features. For example, segmentation can be used to identify distinct objects and characters for image recognition, to identify words in audio for speech recognition, and to identify individuals markets according to common demographics or psychographics. In the past, segmentation was performed using a set of rules defined by domain experts. More recently segmentation has been performed by machine learning processes that can identify patterns in population data. For example, a machine learning processes can build a model to identify the letter "a" in an image based on other images of the letter "a" and images of other letters. Such machine learning processes may build more accurate models when more population data is input to the machine learning process. However, it may be difficult and expensive to obtain enough population data to provide a sufficient level of accuracy. For instance, it may be difficult and expensive to obtain hundreds of thousands of images and identify and label the objects or letters depicted. Accordingly, there is a need for improved machine learning processes that build more accurate models.

SUMMARY

A computer system can perform semi-supervised machine learning processes that are based on user feedback. The semi-supervised machine learning processes can be used to cluster a plurality of entities within a population based on their features and associated labels. For example, the computer system can obtain transaction data for transactions conducted by a plurality of individuals and can cluster the individuals based on the types of transactions that they conduct. The computer system can obtain label data associated with a subset of the entities and can use this information to refine the clustering of entities in a semi-supervised machine learning process.

The computer system can then generate visualization data representing the clusters of entities and the associated labels, which can be displayed on a user interface. The computer system can also generate a b-clustering view and a heat map view of the entities and features. A user can review the clustering of entities and use the user interface to add or modify the labels associated with a particular entity or set of entities. The computer system can receive the user's feedback to update the labels and then re-determine the clustering of entities using the semi-supervised machine learning process with the updated labels as input. The result is that clustering of entities is further refined such that entities having similar features and labels are closer together than in the previous iteration. The computer system can also predict labels to be associated with a particular entity based on the distance between that entity and other entities having a certain label.

The computer system is advantageous because it enables the user to iteratively refine the clustering of entities and easily determine which labels to apply to which entities via the user interface. As such, the computer system can use the user's feedback to improve the accuracy of the machine learning model without requiring a large amount of label data. Therefore, the machine learning model that is built can be improve using the user's feedback instead of requiring a larger amount of input label data to improve accuracy.

Other embodiments are directed to systems associated with methods described herein. A better understanding of the nature and advantages of the present embodiments may be gained with reference to the following detailed description and the accompanying drawings.

TERMS

Figure 1:
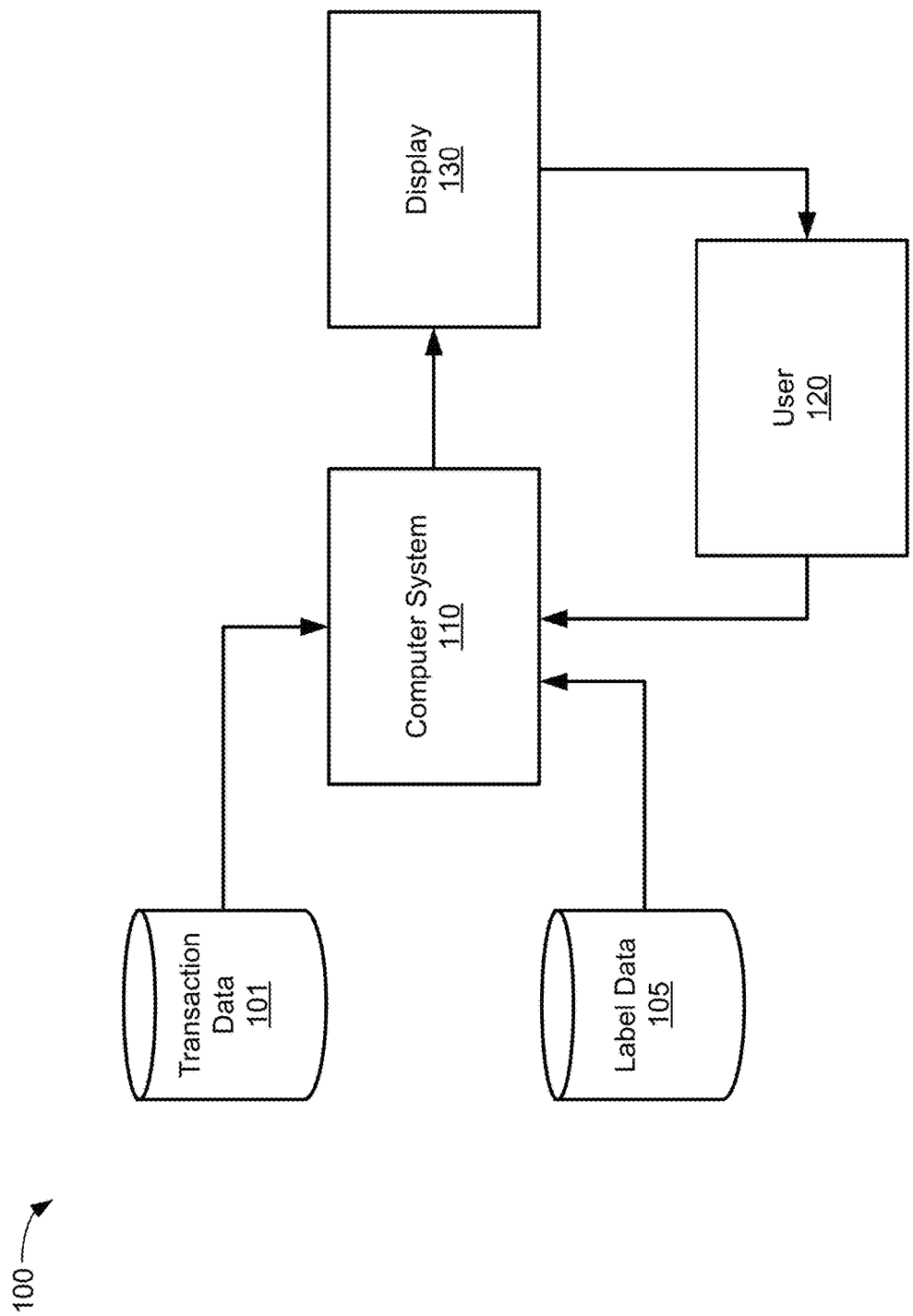
FIG. 1 is a block diagram of a segmentation system enabling a user to provide feedback to a computer system that determines and visualizes segmentations of a population of data, in accordance with some embodiments.

The following description of certain terms used herein may be helpful in understanding the embodiments.

A "computer" may refer to a single computer or a cluster of computers communicating in a system. For example, the computer can be a large mainframe, a minicomputer cluster, or a group of servers functioning as a unit. In one example, the computer may be a database server. The computer may include any hardware, software, other logic, or combination of the preceding for processes the requests from a user interface or from one or more client computers. The computer may comprise one or more computational apparatuses and may use any of a variety of computing structures, arrangements, and compilations for servicing the requests from one or more client computers.

"Machine learning" generally refers to a variety of different computer-implemented processes that build models based on a population of input data by using features of the entities within the population and determining the relationships between the entities. To build the model, the machine learning process can measure a variety of features of each entity within the population and the features of different entities can be compared to determine the relationships. For example, a machine learning process can be used to predict the attributes of entities according to their features and the relationships between the entities.

"Supervised machine learning" generally refers to machine learning processes that receive training data having predetermined solutions (e.g., the data is labeled or classified). A supervised machine learning process can use a set of population data and associated labels for each object in the training data and generate a set of logic to determine labels unlabeled data. For example, a supervised machine learning process can build a character recognition model using images of letters and numbers that are labeled according.

"Unsupervised machine learning" generally refers to machine learning processes that build a logic function based on a set of population data (e.g., training data) without using predetermined solutions associated with the training data. For example, an unsupervised machine learning process could analyze the positioning of black and white pixels in a black and white image to determine patterns in images. In another example, an unsupervised machine learning process could analyze sound waves in audio data to recognize patterns in speech.

Unsupervised machine learning processes can be based on the "features" of the entities in the population. These "features" can be measurements of the characteristics of the data or the relationships between the entities in the data. In a simple feature extraction algorithm, the "features" of an image can include the resolution, chrominance, or luminance of the image. In another simple feature extraction algorithm, the "features" of an individual consumer can be the frequency with which the individual conducts transactions at a particular merchant. More complex feature extraction models can determine features that are more accurate representations of patterns and relationships in the data, but the features determined by such complex models may not be understandable by humans.

"Segmentation metrics" are used to segment entities within a population having similar metrics. The metrics can include "features" of the entities or "labels" that are associated with the entities. There are different types of segmentation metrics. "Traditional" segmentation metrics generally refer to metrics that can be derived from the population data itself. For example, if the population includes images, then "traditional" segmentation metric can include an average color value or average luminance value for the pixels in the image. In another example, if the population includes transactions made by individuals, then the "traditional" segmentation metrics can include the transaction data (e.g., transaction amount, location, merchant identifier, account issuer, etc.), geographic information of the individual (e.g., country, state, zip code, etc.), and demographic information of the individual (e.g. age, sex, income, occupation, education level, etc.) information to group individuals.

"Semi-supervised machine learning" generally refers to machine learning processes that combine both "supervised" and "unsupervised" machine learning processes to build a model of the population data.

In contrast to traditional segmentation metrics, "non-traditional" segmentation metrics may not be able to be derived from the population data itself but must be labeled by a person. For example, if the population data includes images of objects, then "non-traditional" segmentation metrics can include labels that describe that is depicted in the images (e.g., buildings, people, words, etc.). In another example, if the population data includes transactions conducted by individuals, then the "non-traditional" segmentation metrics can include labels that describe the behaviors portrayed by that individual or psychographics describing that individual. Psychographic labels can be based on personality, life style, opinion, culture, etc. For example, "non-traditional" segmentation metrics can include psychographic labels such as shopping styles (e.g., trendy, early adopter, later adopter, etc.) or personality (e.g., adventurous, extrovert, introvert, agreeable, open, etc.). Non-traditional segmentation metrics can be determined using surveys, questionnaires, observations, or focus groups. Such non-traditional segmentation metric collection approaches can be time and labor intensive, usually having low response rates and long time periods between the initial development of the survey and the conclusion, which includes collection and analysis of the surveys to determine labels for each participant.

The term "features" generally refers to the set of measurements for different characteristics or attributes of an entity as determined by a machine learning process. As such, the features of an entity are characteristic of that entity, such that similar entities will have similar features depending on the accuracy of the machine learning process. For example, the "features" of an image can be determined based on color and luminance across its pixels and the distribution of different colors across the image. The features determine by complex machine learning algorithms may not be understandable by humans. That is, the individual feature values may represent a certain characteristic, but this is a result of a complex algorithm and not a simple measurement that can be easily performed by a human. The features can be stored as an array of integer values. For example, the features for two different entities may be represented by the follow arrays: [0.2, 0.3, 0.1, . . . ] for the first entity and [0.3, 0.4, 0.1, . . . ] for the second entity.

The term "labels" generally refers to a description of an entity. The label may be determined by a human. For example, a personality survey may be given to a plurality of individuals and they may each be labeled with one or more of the following labels: "extrovert," "introvert," "adventurous," "open," "agreeable," etc. In another example, images may be labeled with the following labels based on what objects are shown in the image: "building," "people," "car," "truck," "dog," etc. One or more labeled may be applied to each entity. Entities having the same label may have one or more features having similar values.

DETAILED DESCRIPTION

Segmentation can used to divide various entities within a broad population such that the entities within a particular segment have similar features. Machine learning processes can be used to perform segmentation by identifying characteristics and patterns of entities within a population. In general, machine learning refers to computer-implemented processes that build models based on a population of input data by measuring features of the entities within the population and the relationships between the entities. To build the model, the machine learning process can measure a variety of features of each entity within the population and the features of different entities can be compared to determine segmentations. For example, a machine learning process can be used to cluster entities together according to their features and the relationships between the entities.

Machine learning processes can be applied to solve a variety of problems having different types of input data. This is because the machine learning process can build a different model for each particular set of input data. For example, a supervised machine learning process can build a model to identify the letter "a" in an image based on images of the letter "A" and images of other letters. Such machine learning processes may build more accurate models when more population data is input to the process. However, it may be difficult and expensive to obtain enough population data to provide a sufficient level of accuracy. For instance, it may be difficult and expensive to have a person identify and label hundreds of thousands of images of letters.

Prior machine learning systems require large amounts of labeled data in order to provide accurate models. However, instead of requiring thousands of entities to be labeled, a computer system can provide a user interface enabling a domain expert to review visualizations of the input data and apply labels in an iterative process. As such, the user interface enables the computer system to build accurate machine learning models using a large population of data where only a small subset of entities (or even none) within the population are previously labeled. Instead, the domain expert provides iterative feedback to a machine learning process in order to refine clusters of entities and further label the entities in the population. A computer system for iteratively refining clusters for segmentation using semi-supervised machine learning is further described below.

FIG. 1 is a block diagram of a segmentation system 100 enabling a user 120 to provide feedback to a computer system 110 that determines and visualizes segmentations of a population of data, in accordance with some embodiments. The population data can be transaction data 101 containing information on one or more transactions conducting by each individual of a plurality of individuals. The computer system 110 can obtain the transaction data 101 from a payment processor, for example.

The computer system 110 can also obtain label data 105 that associates one or more labels to a certain subset of the plurality of individuals that conducted the transactions in the transaction data 101. The labels that are associated with a particular individual can characterize that individual's behavior, personality, interests, or shopping habits. For example, the labels can include "early adopter," "agreeable," "extrovert," "introvert," "adventurous," or other psychographic or demographic metrics. The computer system 110 can use the transaction data 101 and the label data 105 to divide the individuals into different segmentations according to their associated labels in the label data 105.

However, only a subset of the plurality of individuals may have associated label data. This may be because the label data 105 is based on individual surveys or individual observations or focus group sessions. In order to associate labels with additional individuals, the computer system 110 can measure the features of all of the individuals based on the transaction data 105 and cluster the individual having similar features. The computer system 110 can measure the features of each individual using a feature extraction process (e.g., a deep embedding model or an auto-encoder). Then the computer system 110 can performed use the features for each of the individuals and the label data 105, which is only associated with a subset of the individual, in a semi-supervised machine learning process to update the features for each of the individuals.

The computer system 110 can then cluster the plurality of individuals according to their updated features such that individuals having similar features are clustered together (e.g., using a t-distributed stochastic neighbor embedding clustering process). Then, the computer system and generate visualization data to show the clusters to the user 120 (e.g., a domain expert) via a user interface of the computer system 110 shown on a display 130.

The user 120 can review the clusters of individuals based on a selection of one or more different features and/or labels, and then provide feedback to the computer system 110 to update the label data 1105. For example, the user 120 can apply a new label to a particular individual or they can change the existing label for the individual via a user interface of the computer system 110.

The computer system 110 can receive the feedback from the user 120 and then update that label data 105 accordingly. Then, the computer system 110 can perform the semi-supervised machine learning process again using the updated label data 105 and the previously updated features to determine newly updated features for the individuals. Then the computer system 110 can cluster the individuals according to their newly updated features and re-generate the visualization data to show the updated clusters to the user 120. The user 120 can iteratively provide feedback to the computer system 110 to apply labels and refine the clusters of individuals. Through this iterative process, the user 120 can use the computer system 110 to accurately divide the individuals into different market segments using label data 105 for only a subset of the individuals that are in the transaction data 101, instead of obtaining label data 105 for each of the individuals. This segmentation process is described in further detail below.

Providing the user 120 with visualized clusters of the individuals according to their features is advantageous because it enables the user 120 to more easily refine the labeling of individuals, identify mislabeled individuals, and determine previously unlabeled groups of individuals. By providing the user's feedback (e.g., the updated label data 105) back into the semi-supervised machine learning process, the computer system 110 can further refine the features of the individuals and generate clusters that more accurately represent the underlying interests of the individuals and the relationships between individuals. The user 120 can iteratively repeat this process until they are satisfied with the segmentations of individuals.

Furthermore, while segmentations based on "traditional" metrics (e.g., an individual's geographic location, income, and other demographics) may be easily derived from the transaction data 105, the computer system 110 enables segmentations of the individuals to be based on "non-traditional" metrics (e.g., interests, purchasing behavior, and other psychographic metrics) which cannot be derived from the transaction data 105. Since the user 120 can provide feedback to update the label data 105, the machine learning process can be based on both "traditional" and "non-traditional" metrics for a large number of individuals even though the originally obtained label data 105 may only include labels for a small subset of the individuals included in the transaction data 101. Thus, the computer system 110 improves the accuracy of machine learning processes through iteration it reduces the amount of time and resources spent obtaining sufficient label data 105. The computer system 110 is described in further detail below with respect to FIG. 2.

Figure 2:
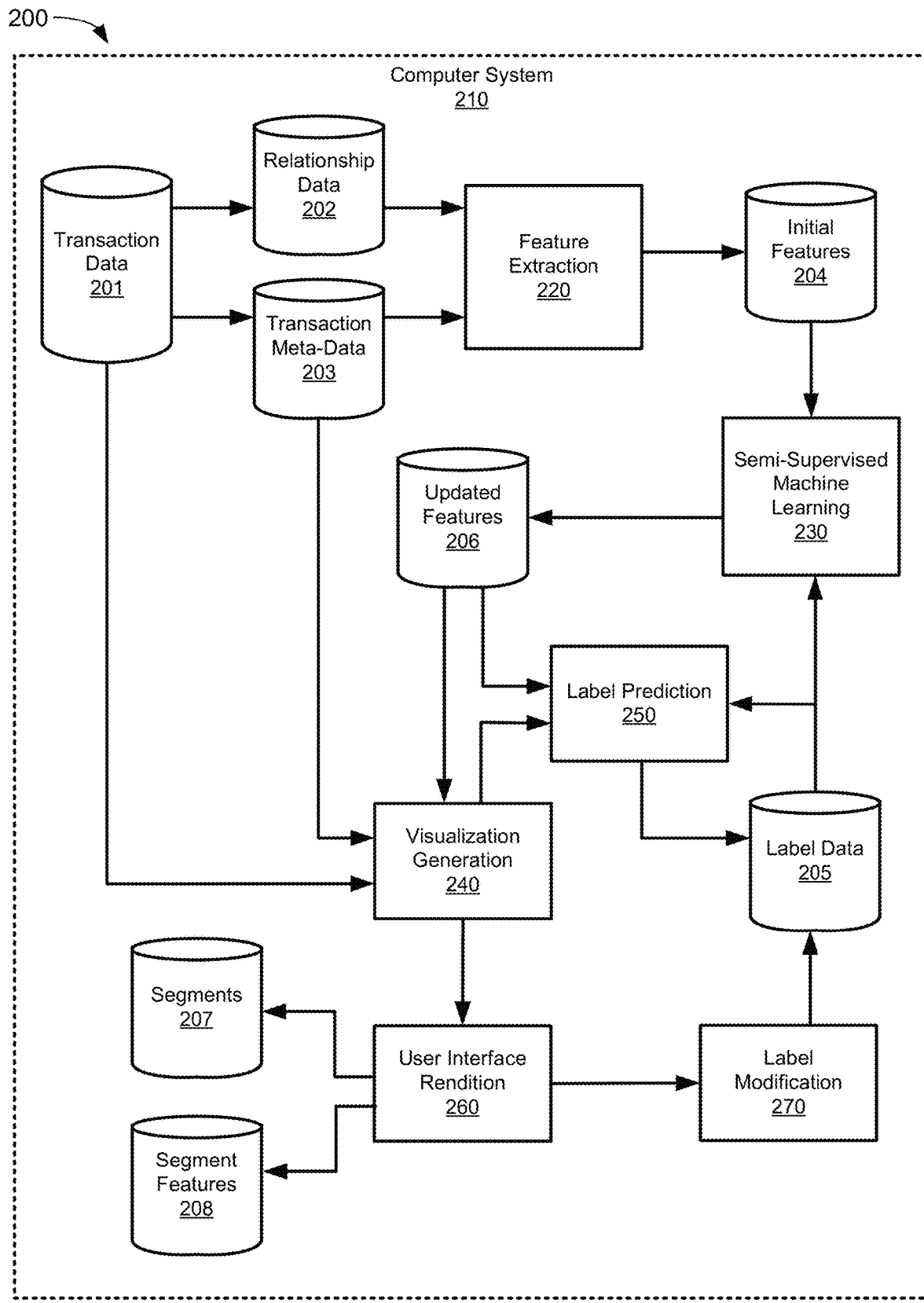
FIG. 2 is a functional block diagram of a computer system performing segmentation, in accordance with some embodiments.

As discussed above, a computer system can receive a population of data and cluster the entities of that population according to the features of the entities. FIG. 2 is a functional block diagram 200 of a computer system 210 that can perform an iterative segmentation process using feedback from a user, in accordance with some embodiments. The computer system 210 may be implemented in the segmentation system 100 of FIG. 1 (e.g., as the computer system 110).

As discussed above, the computer system 210 can segment entities of a population based on their features and associated labels. In this embodiment, the computer system 210 can obtain a set of transaction data 201 including information on transactions conducted by a plurality of individuals. The computer system 210 can also obtain label data 205, including one or more labels associated with a subset of the individuals. The computer system 210 can determine segmentations of the individuals based on the transaction data 201 and the label data 205 as further described below.

The transaction data 201 can include information for transactions made by the plurality of individuals. The transaction data 201 can include both relationship data 202 and transaction meta-data 203. The relationship data 202 indicates which individuals conduct transactions with which merchants. That is, for each particular individual, the relationship data 203 indicates a certain set of merchants at which that particular individual conducted transactions. The transaction meta-data 202 can include information about each of the transactions, such as an identifier of the merchant, a location of the merchant, an amount of the transaction, a date and time of the transaction, a payment processor for the transaction, an issuer of the payment account used, etc.

The label data 205 can include one or more labels associated with a subset of the individuals. The label data 205 may be based on surveys, questionnaires, or observations involving the individuals of the subset. The labels associated with a particular individual can describe the personality, behavior, life style, opinion, or culture of that individual. For example, the label data 205 can include labels for different shopping styles (e.g., trendy, early adopter, later adopter, etc.) or for different personality traits (e.g., adventurous, extrovert, introvert, agreeable, open, etc.).

The computer system 210 can perform feature extraction 220 on the transaction data 201 to determine initial features 204 for both the individuals that conducted the transactions and the merchants using a machine learning process such as a deep embedding model or using an auto-encoder, for example. The initial features 204 are a high dimensional data representation that captures the underlying characteristics of the individual or merchant. That is, each individual or merchant can be associated with a set of features determines based on the transactions that they were involved in. The features can be represented as a set of numbers. For example, the set of features for a first individual can be [0.2, 0.3, 0.1, . . . ] and the set of features of a different, second individual can be [0.3, 0.4, 0.1, . . . ].

While the features determined by machine learning processes may not necessarily be understandable by humans, they still represent the characteristics of the individuals and merchants and can show the patterns and relationships between them. The use of deep embedding models for feature extraction is further described in Mikolov, T., and J. Dean. "Distributed representations of words and phrases and their compositionality." *Advances in neural information processing systems* (2013). The use of auto-encoders for feature extraction is further described in Vincent, Pascal, et al. "Stacked denoising autoencoders: Learning useful representations in a deep network with a local denoising criterion." *Journal of Machine Learning Research* 11. Dec. (2010): 3371-3408.

After determining the initial features 204, the computer system 210 can perform semi-supervised machine learning process 230 using the initial features 204 and the label data 205. The semi-supervised machine learning process 230 can determine updated features 206 that are based on an unsupervised machine learning process using the initial features 204 as input and a supervised machine learning process that uses both the label data 205 and the initial features 204 as input.

While the label data 205 may only be associated with a subset of the individuals, combining the supervised machine learning process using the label data 205 with the unsupervised machine learning process provides more accurate features for the plurality of individuals as a whole. That is, the semi-supervised machine learning process will determine features that are more similar for individuals having similar behaviors and personalities compared to the unsupervised machine learning process alone.

For example, a first individual that has been labeled as an "extrovert" (e.g., based on a survey) may conduct more transactions at bars and dance clubs compared to the average individual. Based on this information, a second individual that also conducts more transactions at bars and dance clubs compared to the average individual may be determined to have features that are more similar to a third individual that is labeled as "extrovert," even if that third individual does not conduct more transactions at bars and dance clubs compared to the average individual. These individuals may be determined to have more similar features because the transactions that they conduct, considered as a whole and in comparison with other individuals, are consistent with the "extrovert" label.

As such, even if the label data 205 only includes labels for a small subset of the plurality of individuals that are included in the transaction data 201, the label data 205 can be used to refine the features for all of the individuals, providing a more accurate machine learning model overall (e.g., better accuracy in determining similar features for individuals having similar behavior or personality).

The semi-supervised machine learning process 230 is described in further detail below with respect to FIG. 3.

After determining the updated features 206 using semi-supervised machine learning 230, the computer system 210 can perform visualization generation 240 using the updated features 206. The computer system 210 can perform a variety of different processes that can be used to generate different visual representations of the plurality of individuals and their associated features and labels. These visual representations enable the user (e.g., a marketing segmentation expert) to review and understand the segments of individuals and further enable the user to update or refine the labeling of those individuals. Different visual representations based on the updated features 206 can be used by the user to get a different perspectives of the relationships and patterns between the individuals to ensure that the labels are applied correctly.

One visual representation of the individuals is a cluster view. The computer system 210 can generate the cluster view using a clustering method based on the updated features 206. The cluster view can show the plurality of individuals as points in a two-dimensional plane clustered according to their features. The cluster view can maintain the same distance between individuals in the compressed two-dimensional view as in higher dimensional space of the greater set of features. The clusters can also indicate the labels that are associated with each individual.

The computer system 210 can also perform a bi-clustering analysis and generate a heat map visual representation of the values of the features. The user can review the resulting bi-clustering view to determine patterns in the features of a group of individuals. The computer system 210 can also perform statistical profiling and generate a heat map view that shows the values of the features. The computer system 210 can also generate a transaction view based on the transaction data 201, including the transaction meta-data 203. The transaction view can show a summary of an individual's transactions with different types of merchants. The user can review the different visual representations in order to accurately determine which labels should be associated with a particular individual.

The different types of visual representations and their generation is described in further detail below.

After generating the different visual representations, the computer system 210 can perform user interface rendition 260 in order to display the visual representations to the user and provide tools enabling the user to provide feedback on the labeling of individuals. The user interface can enable the user to select groups of individuals to see further details or different visual representations of those individuals. For example, the user can use a brush or polygonal selection tool to select one or more individuals shown in a cluster view. In response to a set of individuals being selected by the user, the computer system 210 can generate a variety of different visual representations of those individuals are described here. In addition, the user can select certain individuals or groups of individuals and associate the selected individuals with a particular label selected by the user. The user can also add new labels or remove associations of labels with certain individuals via the user interface.

The user can also use the user interface to select different segments 207 of the individuals and review the features 208 associated with those segments 207. For example, the user can select an "extrovert" label and view a list of individuals associated with the "extrovert" label and the features of the individuals in that list. In this manner, the computer system 210 can be used to identify individuals in various market segments.

Figure 4:
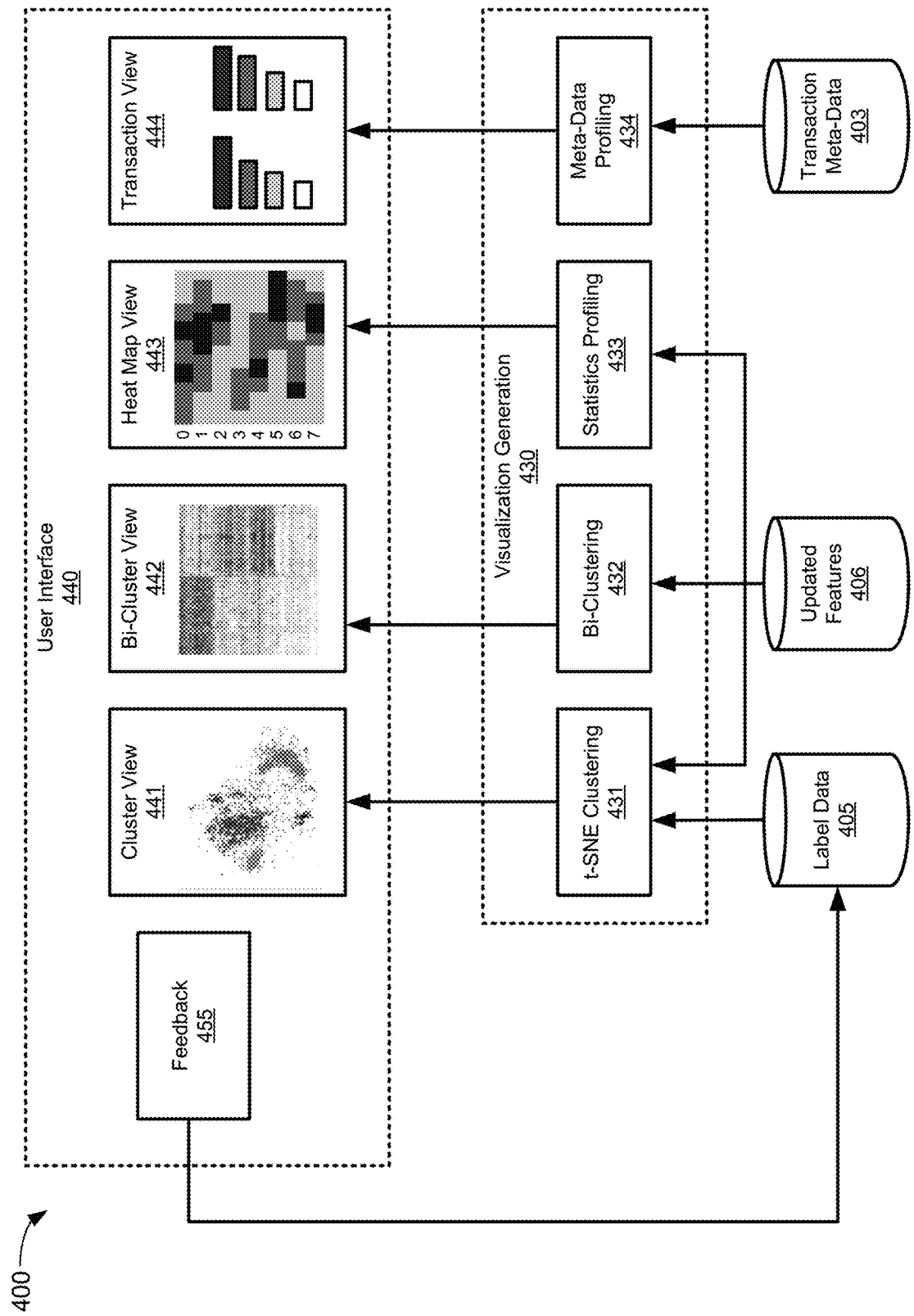
FIG. 4 is a functional block diagram of a visualization generation process and corresponding user interface for showing visual representations and receiving user feedback, in accordance with some embodiments.

The user interface is described in further detail below with respect to FIG. 4.

Upon receiving feedback from the user, the computer system 210 can perform label modification 270 to update the label data 205 accordingly. For example, if the user adds a new label and assigns the label to a first set of individuals, the computer system 210 can associate that first set of individuals with the new label in the label data 205. Then, after modifying the label data 205, the computer system can re-perform the semi-supervised machine learning process 230 using the label data 205 that is now updated based on the user's feedback. Then the computer system 210 can re-generate the various visual representations and render the views in the user interface for further review by the user. As such, the user interface enables the user greatly improve the accuracy of the segmentations by iteratively refining the labeling of the individuals.

A computer system can use generate clusters for segmentation based on the features of entities in a population. The computer system can use a semi-supervised machine learning process based on the labels associated with a subset of the entities to determine features that are more refined compared to an unsupervised machine learning process.

Figure 3:
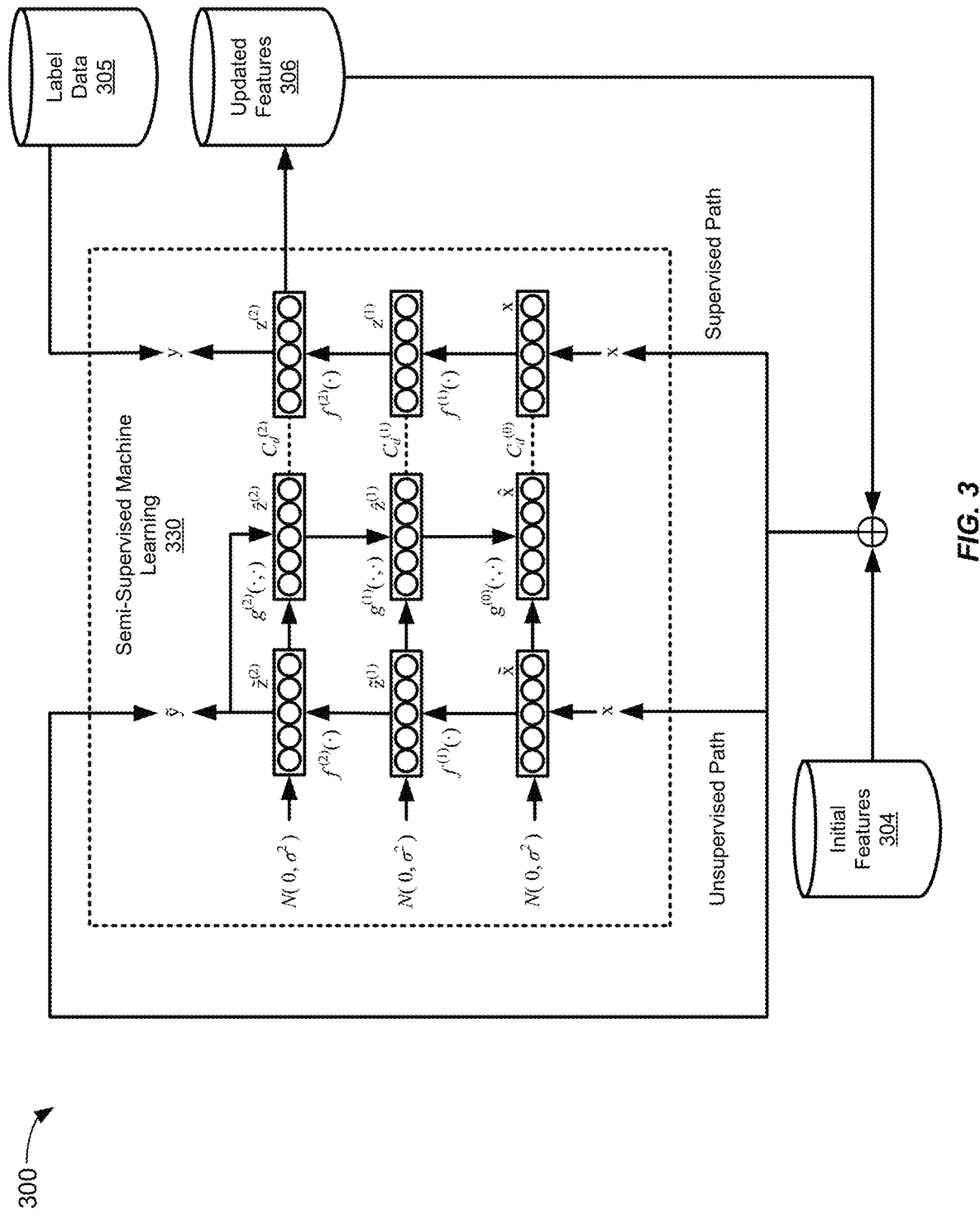
FIG. 3 is a schematic diagram of a semi-supervised machine learning process, in accordance with some embodiments.

FIG. 3 is a schematic diagram of a semi-supervised machine learning process 330, in accordance with some embodiments. The semi-supervised machine learning process 330 can be used in the computer system 210 of FIG. 2. The semi-supervised machine learning process 330 can first receive initial features 304 of entities in a population and label data 305 for a subset of the entities as input. For example, the initial feature 304 can be determined as described above with reference to FIG. 2. The semi-supervised machine learning process 330 can combine an unsupervised machine learning process with a supervised machine learning process that uses the label data 305 to determine updated features 306.

As discussed above, the semi-supervised machine learning process can be re-performed in response to user feedback that updated the label data 305. On subsequent iterations of the semi-supervised machine learning process 330, the process can use the updated features 306 and the label data 305, as updated based on the user feedback, as input.

A variety of different semi-supervised machine learning processes can be used to determine the updated features 306. In this embodiment, the semi-supervised machine learning process 330 can be a ladder network. The ladder network shown in FIG. 3 can determine the updated features 306 using both unsupervised machine learning (left path) and supervised machine learning (right path). In the ladder network, every layer contributes to the cost function which trains the layers above (both encoder and decoder) to learn the denoising function which maps the corrupted $z^~$ onto the denoised estimate $z^\wedge$. As the estimate $z^\wedge$ incorporates all prior knowledge about z, the same cost function term also trains the encoder layers below to find more refined features. The cost functions $C_d$ on each layer can minimize the difference between $z^\wedge$ and z. The output $y^~$ of the encoder can also be trained to match the label data 305. Semi-supervised machine learning processes using such ladder networks are further described in Rasmus, A. et al. *Semi-Supervised Learning with Ladder Networks* (2015). arXiv: 1507.02672.

As such the updated features 306 capture the characteristics of the labels in the label data 305. For example, if a subset of individuals take a personality questionnaire and are labeled based on their personality type, the semi-supervised machine learning process 330 can use this personality information to refine the updated features 306 to account for such personality traits. Using the semi-supervised machine learning process 330, individuals that have similar personalities will have more similar features. Therefore, the semi-supervised machine learning process can be customized for different applications by providing different types of label data 305.

Furthermore, the updated features 306 can be further refined each time the user provides feedback to modify the label data 305. Then, the user can review visual representations of the updated features 306 in order to better identify other entities that should be associated with a particular label. Once this particular label is applied, the semi-supervised machine learning process 330 can be performed again using that updated label data 305 to further refine the features, thereby enabling the user to better identify further labels that should be applied to certain entities. This process can repeat iteratively until the user is satisfied with the segmentations.

Interactive Visualization of Features and Labels

The user interface enables the user (e.g., domain expert) to explore and understand clusters and features in order to refine the segmentations. The user interface also enables the user to assign new labels to certain entities or modify their existing labels in order to update the semi-supervised machine learning model, which will then update the refined results in the visual representations. FIG. 4 is a functional block diagram of a visualization generation process 430 and corresponding user interface 440 for showing visual representations and receiving user feedback, in accordance with some embodiments. The visualization generation process 430 and the user interface 440 may be implemented in the computer system 210 described above with reference to FIG. 2.

As discussed above, the computer system can perform visualization generation 430 using label data 405, updated features 406, and transaction meta-data 403. The computer system can perform a variety of different processes that can be used to generate different visual representations of the plurality of individuals and their associated features and labels. These visual representations enable the user (e.g., a marketing segmentation expert) to review and understand the segments of individuals and further enable the user to update or refine the labeling of those individuals. Different visual representations based on the updated features 406 can be used by the user to get a different perspectives of the relationships and patterns between the individuals to ensure that the labels are applied correctly. The various visual representations are further discussed below.

A. Cluster View

One visual representation of the individuals shown in the user interface 440 is a cluster view 441. The computer system can generate the cluster view 441 using a clustering method, such as a t-distributed stochastic neighbor embedding (t-SNE), based on the updated features 406. The cluster view 441 can show the plurality of individuals as points in a two-dimensional scatter plot mapped according to their features. The coordinates of the points in the scatter plot are pre-calculated using the t-SNE algorithm. Such t-SNE algorithms are further described in Maaten, Laurens van der, and Geoffrey Hinton. "*Visualizing data using t-SNE.*" Journal of Machine Learning Research 9. Nov. (2008): 2579-2605.

The user interface 440 can show the cluster view 441 showing the scatter plot and enable the user can brush on the layout to select one or more points (e.g., individuals) of interest to review their associated features and labels. Then, the user interface 440 can highlight the points within the brushed area. The user can use different methods for brushing, including a rectangular brush, a polygonal brunch, or an elliptical brush. The user can select the points by dragging the brush in the appropriate area to outline the intended points. The user can also select the points in the cluster view 441 by searching based on the properties of the point such that all points in the cluster view 441 matching the searched property can be highlighted.

To help user review the segmentations, the user can zoom in and zoom out on the clusters in the scatter plot. For example, to zoom into an area, the user can click on a zoom-in button on the control panel. Then by clicking the zoom-out button, the cluster view 441 can go back to the previous zoomed area. The users can also go back to the top level directly by clicking a reset button. The user can also re-layout the points in the cluster view 441 using a layout button.

The cluster view 441 also enables the user to label the data points (e.g., the individuals represented by the data points). These labels can be represented by different colors or different shapes. The user can click a "label" button in the control panel to label selected points with an existing label or a new label. If a new label is added, the new label can be listed in a labelling table in which different labels can be. The user can also change the label name (e.g., by double clicking on the label to select and change it). The user can also add a selection of points to an existing label group (e.g., by clicking a '+' icon) or delete a label group (e.g., by clicking an 'x' icon). The shapes or colors representing the labels for the points in the cluster view 441 can change accordingly.

B. Bi-Cluster Distribution Heat Map View

The computer system can also perform a bi-clustering analysis 432 and generate a bi-cluster view 441 showing a distribution heat map of the feature distribution in the user interface 440. The user can review the resulting bi-cluster view 442 to determine patterns in the features of a group of individuals. The distribution heat map of the bi-cluster view 442 can visualizes the distribution of feature values in each dimension within brushed points in the cluster view 441. If no point is brushed, the bi-clustering analysis 432 can calculate the distributions based on all points in the cluster view 441 (e.g., based on the features for all of the individuals).

Each row of the distribution heat map in the bi-cluster view 442 can represent the distribution of a feature. The distribution can represented as a binned histogram. For example, the color of a cell can encode the number of values that fall into the bin such that a darker cell means a larger value and vice versa. The user interface 440 can enable the user can adjust the number of bins and the value range of the histogram in the control panel. The user can then apply the change by clicking the refresh button. The user interface 440 can include a label for each row of the distribution heat map to indicate the feature.

Since the clusters generated by the t-SNE algorithm often have unique dimension distribution characteristics, the bi-cluster view 442 supports sorting function. The user can sort the features either by the kurtosis or skewness of their histograms, so that features with dense value range will be considered more important and ranked higher in sorting.

C. Feature Heat Map View

The computer system can also perform statistical profiling 433 and generate a heat map view 443 that shows the values of the features. The heat map view 443 can directly visualize the values of the features of the points in the brushed area of the cluster view 441. If no point is brushed, all of the points in the cluster view 441 can be visualized in the heat map view 443. The user can set the range of feature values to be visualized by the statistics profiling algorithm 433 in the control panel. For example, the user can input a positive number "r" and the range that will be visualized can be [−r, +r]. The feature values that fall out of the range can be rendered the same color as the range boundary value. Since values can be both positive and negative, they can be encoded in diverging colors (e.g., negative values can be red and positive values can be blue). To accelerate the visualization generation, only an even sampling of features can actually visualized when the number of features is much larger than the width of the heat map view 443 in the user interface.

The heat map view 443 can also include a bi-clustering to enable the user to discover interesting clusters. The user can enable the bi-clustering function in the control panel and can adjust the number of potential clusters in the dimensions (rows) and records (columns) of features. The user interface 440 can also enable the user to use a brush in the heat map view 443 to select the corresponding points in the cluster view 441.

D. Meta-Data View

The computer system can also generate a transaction view 444 based on a meta-data profiling analysis 434 of the transaction meta-data 203. The transaction view 444 can show a detailed summary of an individual's transactions with different types of merchants. The transaction view 444 can show past transaction categories and information regarding the merchants with which the transactions were conducted. The transaction view 444 can enable the user to use the individuals transaction history to verify the accuracy of the labeling.

E. User Interface Control Panel

As discussed above, the user interface 440 includes a control panel for adjusting the different views. The control panel can further include an iteration and layer switch control. The interface can automatically fetch the number of semi-supervised machine learning iterations and the number of layers in each iteration. The user interface 440 can include buttons to select different iterations (e.g., by clicking on the layer button to load a different set of features server to the interface). To support this functionality, the computer system can save a separate copy of the updated features determined by each iteration of the machine learning process.

F. Exemplary User Interface

Figure 5:
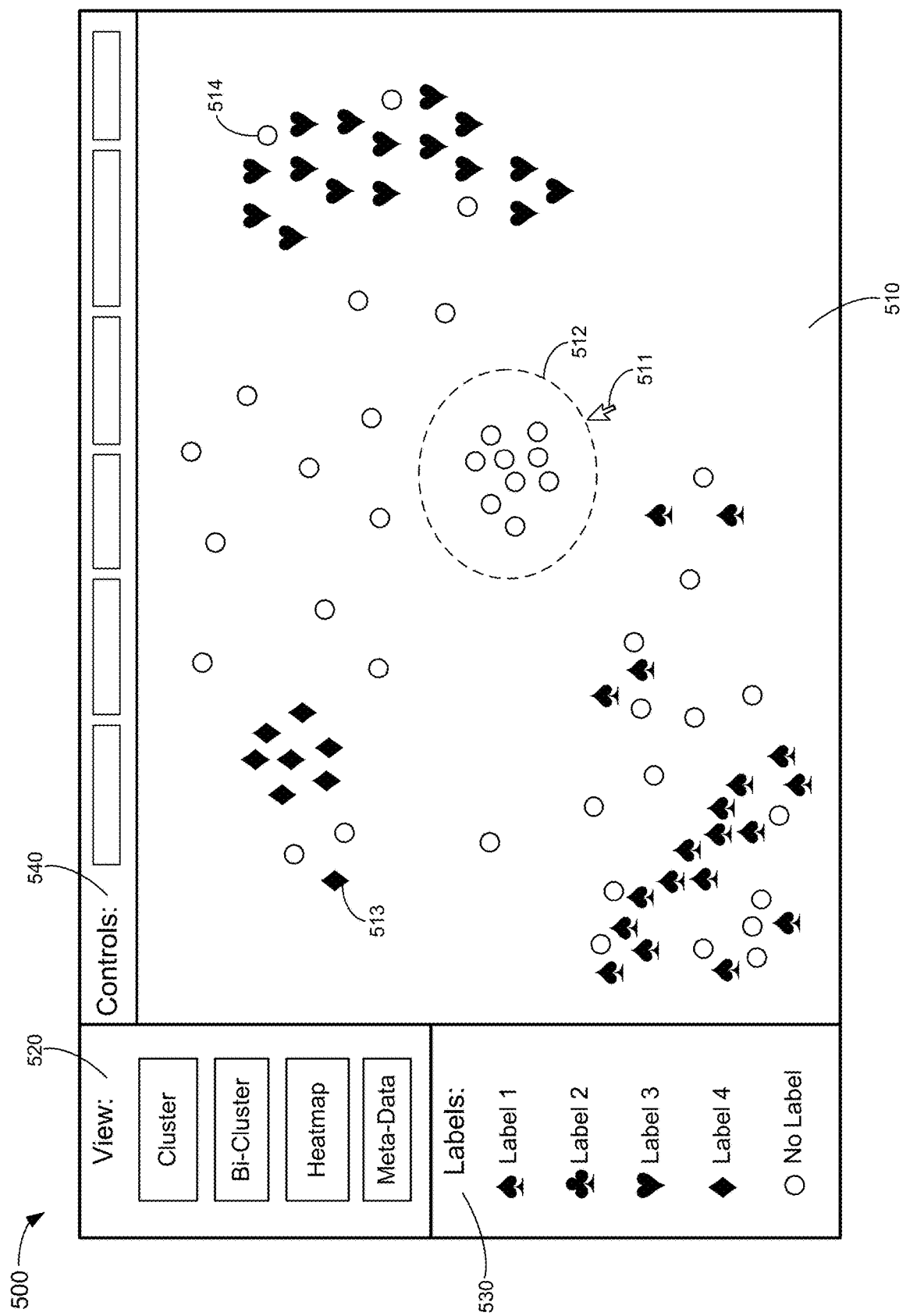
FIG. 5 shows is an illustration of a user interface showing a cluster view, a view selection panel, a label selection table, and a control panel, in accordance with some embodiments.

As discussed above, the user interface can include a variety of different views and can enable the user to provide feedback to the computer system. FIG. 5 shows is an illustration of a user interface 500 showing a cluster view 510, a view selection panel 520, a label selection table 530, and a control panel 540, in accordance with some embodiments.

As discussed above, the user can review the different views of the user interface 500 in order to identify labels for data points that should be modified or to add new labels. To support this functionality, the user interface 500 includes a control panel 540 including a variety of different buttons to enable the different functions described above.

The user interface 500 includes the view selection panel 520 in order to switch between the different views. For example, the user can make a selection to view the cluster view 510, or the bi-cluster view, the heat map view, or the meta-data view as discussed above. The user interface 500 can also show each of these views at once, with selections on one view being highlighted in all of the views.

The user interface 500 includes the label selection table 530 to list the different labels and enable the user to select which labels to view. For example, as shown in FIG. 5, there can be 4 labels associated with the data points in the cluster view 510. The four different labels can be represented in the cluster view 510 by "spade," "club," "heart," and "diamond" symbols, respectively. A data point without a label can be indicated by a "circle" symbol. As discussed above, the labels can also be represented by different colors.

As discussed above, the user interface 500 enables the user to easily review and modify the labeling of the data points. For example, the user may notice that a certain set of data points are clustered together since they have similar features, but they are not labeled. In this situation, the user can use a mouse cursor or pointer 511 to brush over the data points using an elliptical selection tool 512 and can add a new label to the label selection table 530. The computer system can receive this feedback from the user, update the label data, re-perform the semi-supervised machine learning process using the updated label data, and regenerate the views for the user interface 500 as discussed above. The selection tool can be enabled using a button in the control panel 540.

The user can also select single points to modify instead of brushing across multiple points. For example, the user can determine that point 514 should be labeled with "Label 3" (represented by the "heart" symbol). Accordingly, the user can select point 514 and then select the label to be associated with that point. The computer system can receive this feedback from the user, update the label data, re-perform the semi-supervised machine learning process using the updated label data, and regenerate the views for the user interface 500 as discussed above.

In another example, the user can determine that point 513 should not be labeled with "Label 4" (represented by the "diamond" symbol). Accordingly, the user can select point 513 and then select a button in the control panel 540 to remove the association of the label with that point. The computer system can receive this feedback from the user, update the label data, re-perform the semi-supervised machine learning process using the updated label data, and regenerate the views for the user interface 500 as discussed above.

Figure 6:
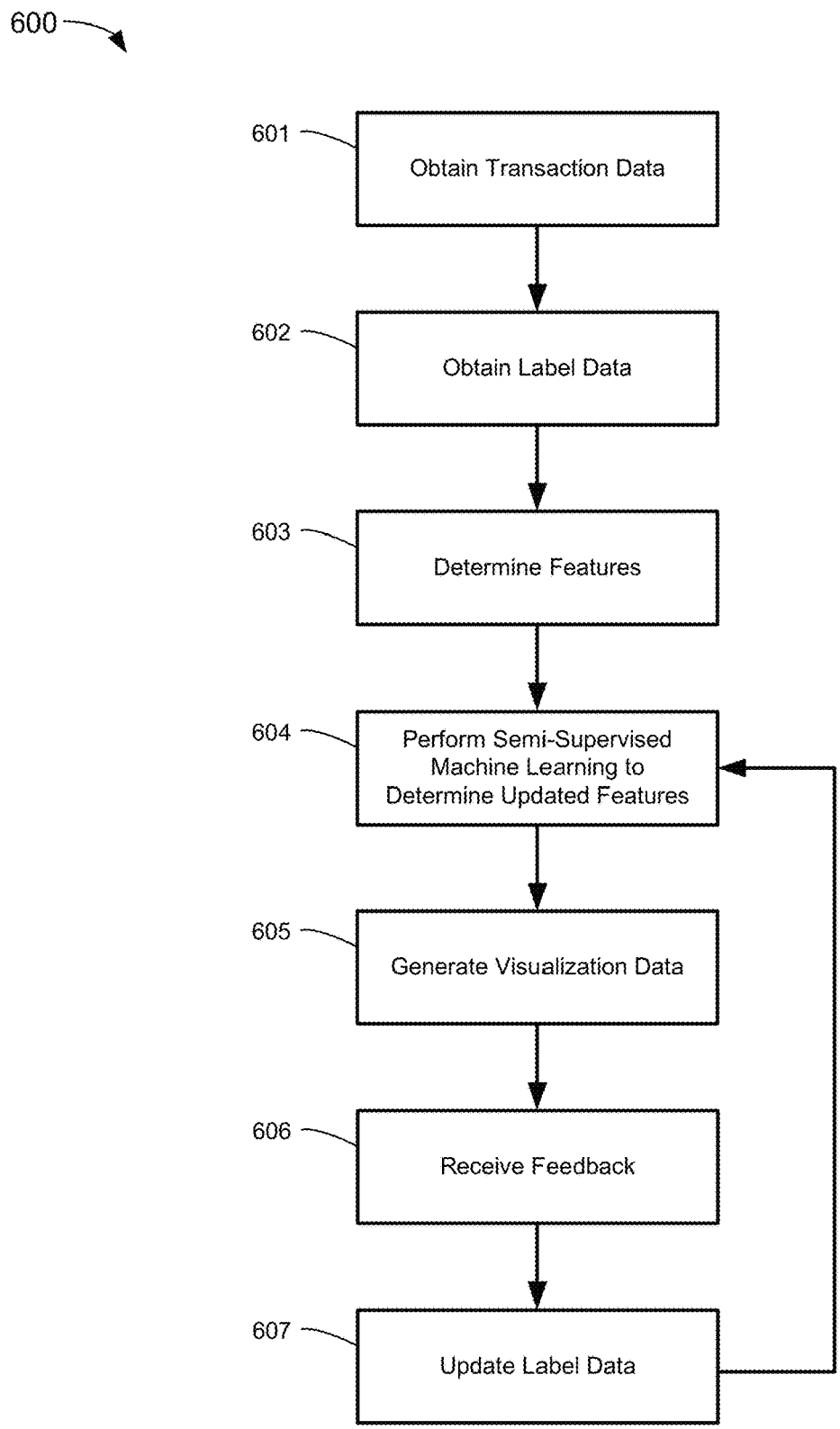
FIG. 6 is a flowchart of a method for performing semi-supervised machine learning using user feedback, in accordance with some embodiments.

Exemplary Method for Performing Semi-Supervised Machine Learning Based on User Feedback FIG. 6 is a flowchart 600 of a method for performing semi-supervised machine learning using user feedback, in accordance with some embodiments. This method can be performed by a computer system, such as the computer system described herein.

At 601, the computer system can obtain transaction data. The transaction data can include a data for a plurality of transactions conducted by a plurality of different individuals. The data for each transaction can include one or more of the transaction amount, the location of the transaction, a merchant identifier of a merchant involved in the transaction, an identifier of the account issuer of the account used in the transaction, geographic information of the individual conducting the transaction (e.g., country, state, zip code, etc.), and demographic information of that individual (e.g. age, sex, income, occupation, education level, etc.).

At 602, the computer system can obtain label data. The label data can be associated with a subset of the plurality of individuals that conducted the transactions within the transaction data. The label data can assign one or more labels to each individual of that subset. The labels that are associated with a particular individual can characterize that individual's behavior, personality, interests, or shopping habits. For example, the labels can include "early adopter," "agreeable," "extrovert," "introvert," "adventurous," or other psychographic or demographic metrics. The computer system can use the transaction data and the label data to divide the individuals into different segmentations according to their associated labels in the label data. As described herein, the computer system can use the features to segment the plurality of individuals into one or more segments of individuals based on the label data.

At 603, the computer system determine sets of initial features based on the transaction data. The computer system can determine a set of initial features for each individual that conducted transactions in the transaction data. These sets of initial features can be determined using a deep embedding model or an auto-encoder process, for example. The features can be measurements of the characteristics of the individuals or the relationships between the plurality of individuals. For example, the features of an individual consumer can be the frequency with which the individual conducts transactions at a particular merchant. As described herein, the computer system can cluster the individuals based on their features.

At step 604, the computer system can perform a semi-supervised machine learning process to determine sets of updated features using the sets of initial features and the label data. The semi-supervised machine learning process can be a Ladder network including both an unsupervised machine learning process, which uses the sets of initial features and the sets of updated features, and a supervised learning process, which uses the sets of initial features, the sets of updated features, and one or more of the label data and user feedback. These updated features can be used for clustering the individuals. Since the updated features are based on the label data or the user feedback, the resulting clusters are more accurate and refined in their representation of the similarity of the individuals in that cluster.

At 605, the computer system can generating, by the computer, visualization data that is based on the semi-supervised machine learning process. The visualization data can be a cluster diagram of the individuals based on their associated features and label data. The visualization data can be a user via a user interface.

At step 606, the computer system can receive the user's feedback. The feedback can correspond to the data that is visualized on the user interface. The user interface can enable the user to provide feedback to the computer system by adding, deleting, or changing the labels associated with an individual or group of individuals.

At step 607, in response to receiving the user's feedback, the computer system can update the label data based on the feedback. For example, new labels can be associated with a particular individuals as indicated in the user feedback.

Since the labels can been refined by the user, the computer system can re-perform the semi-supervised machine learning process at step 604 using the updated label data. The features for the plurality of individuals are further refined using the updated label data, thereby making the resulting visualization data more accurate in its representation of the relationships between the individuals. The visualization data is re-generated at step 605 using the updated features and the updated label data. This process can be re-performed every time the user provides feedback.

Exemplary Computer System for Performing Semi-Supervised Machine Learning Based on User Feedback Any of the computer systems mentioned herein may utilize any suitable number of computer subsystems to implement their functions and processes. For example, a computer system can include a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems can be interconnected via a system bus. The computer system can include a processor and system memory. Additional subsystems can include a printer, user interface devices (e.g., keyboard and mouse), storage disks, a display, which can be coupled to display adapter, for example. Peripherals and input/output (I/O) devices, which couple to an I/O controller, can be connected to the computer system by any number of means known in the art (e.g., USB, FireWire). For example, I/O port or a communication interface (e.g. Ethernet, Wi-Fi, etc.) can be used to connect computer system to a wide area network such as the Internet, a mouse input device, or a scanner. The interconnection via system bus allows the processor to communicate with each subsystem and to control the execution of instructions from system memory or the storage disk (e.g., a fixed disk, such as a hard drive, or optical disk), as well as the exchange of information between subsystems. The system memory and/or the storage disk may embody a computer readable medium.

Further Embodiments of the Systems and Methods

The systems and methods described herein can be applied to a variety of machine learning processes using a variety of different types of population data. For example, the systems and methods described herein can be applied to image recognition or speech recognition machine learning processes. For example, a user can use the user interface described herein to modify labels of words or phrases associated with different audio segments of speech and the machine learning process can iteratively perform speech recognition machine learning processes based on the users feedback. The systems and methods described herein can be applied to any other machine learning process that relies on label data collected by humans.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps.

Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A method comprising:
    obtaining, by a computer, transaction data from transactions conducted by a plurality of individuals;
    obtaining, by the computer, label data associated with a subset of the plurality of individuals, the label data assigning one or more labels to each individual of the subset;
    performing, by the computer, a semi-supervised machine learning process using the transaction data and the label data;
    generating, by the computer, visualization data that is based on the semi-supervised machine learning process and is displayed to a user, the visualization data representing one or more segmentations of the plurality of individuals;
    receiving, by the computer, user feedback from the user corresponding to the visualization data; and
    performing, by the computer, the semi-supervised machine learning process, using the user feedback, the transaction data, and the label data, and wherein the method further comprises:
    determining, by the computer, sets of initial features based on the transaction data, the sets of initial features including a set of initial features for each individual of the plurality of individuals,
    wherein the semi-supervised machine learning process includes determining sets of updated features based on the sets of initial features and the label data, the sets of updated features including a set updated features for each individual of the plurality of individuals,
    wherein the generating of the visualization data is based on the sets of updated features and the label data, and
    wherein the sets of updated features are different than the sets of initial features, the sets of updated features more consistently characterizing individuals to specific labels than the sets of initial features.

2. The method of claim 1, further comprising segmenting, by the computer, the plurality of individuals into one or more segments of individuals based on the label data, each individual of each segment of individuals being associated with a particular label in the label data.

3. The method of claim 2, wherein the determining of the sets of initial features is based on a deep embedding model or an auto-encoder process.

4. The method of claim 2, further comprising performing, by the computer, one or more of a t-distributed stochastic neighbor embedding clustering process based on the sets of updated features, a bi-clustering process based on the sets of updated features, and a statistical summarization process based on the sets of updated features, and a profiling process on meta-data associated with the transaction data, wherein the generating of the visualization data is based on one or more of the t-distributed stochastic neighbor embedding clustering process, the statistical summarization process, and the profiling process.

5. The method of claim 2, wherein the semi-supervised machine learning process includes a Ladder network process using an unsupervised machine learning process based one of the sets of initial features and the sets of updated features and a supervised learning process based one of the sets of initial features and the sets of updated features and one or more of the label data and the user feedback.

6. The method of claim 1, further comprising modifying, by the computer, the label data based on the user feedback, wherein the semi-supervised machine learning process performed in response to the receiving of the user feedback is based on the label data modified based on the user feedback.

7. The method of claim 6, wherein the user feedback comprises a first command to apply a first label to a first individual represented in the visualization data or a second command to remove the first label from the first individual.

8. The method of claim 1, further comprising:
    performing, by the computer, a clustering algorithm based on the semi-supervised machine learning process to determine clusters of individuals of the plurality of individuals; and
    modifying, by the computer, the label data associated with a first individual based on a distance between the first individual and a first cluster of individuals.

9. The method of claim 1, wherein the transaction data comprises image recognition data or speech recognition data.

10. A machine learning computer system, comprising:
    a non-transitory computer readable storage medium storing a plurality of instructions; and
    one or more processors for executing the instructions stored on the non-transitory computer readable storage medium to:
    obtain transaction data from transactions conducted by a plurality of individuals;
    obtain label data associated with a subset of the plurality of individuals, the label data assigning one or more labels to each individual of the subset;
    perform a semi-supervised machine learning process based on the transaction data and the label data;
    generate visualization data that is based on the semi-supervised machine learning process and is displayed to a user, the visualization data representing one or more segmentations of the plurality of individuals;
    receive user feedback from the user corresponding to the visualization data; and
    perform the semi-supervised machine learning process, in response to the receiving of the user feedback, based on the user feedback, the transaction data, and the label data, and wherein the instructions stored on the non-transitory computer readable storage medium cause the one or more processors to:
    determine sets of initial features based on the transaction data, the sets of initial features including a set of initial features for each individual of the plurality of individuals,
    wherein the semi-supervised machine learning process includes determining sets of updated features based on the sets of initial features and the label data, the sets of updated features including a set updated features for each individual of the plurality of individuals, wherein the generating of the visualization data is based on the sets of updated features and the label data, and wherein the sets of updated features are different than the sets of initial features, the sets of updated features more consistently characterizing individuals to specific labels than the sets of initial features.

11. The computer system of claim 10, wherein the non-transitory computer readable storage medium further stores instructions to segment the plurality of individuals into one or more segments of individuals based on the label data, each individual of each segment of individuals being associated with a particular label in the label data.

12. The computer system of claim 10, wherein the determining of the sets of initial features is based on a deep embedding model or an auto-encoder process.

13. The computer system of claim 10, wherein the computer readable storage medium further stores instructions to perform one or more of a t-distributed stochastic neighbor embedding clustering process based on the sets of updated features, a bi-clustering process based on the sets of updated features, and a statistical summarization process based on the sets of updated features, and a profiling process on meta-data associated with the transaction data, wherein the generating of the visualization data is based on one or more of the t-distributed stochastic neighbor embedding clustering process, the statistical summarization process, and the profiling process.

14. The computer system of claim 10, wherein the semi-supervised machine learning process includes a Ladder network process using an unsupervised machine learning process based one of the sets of initial features and the sets of updated features and a supervised learning process based one of the sets of initial features and the sets of updated features and one or more of the label data and the user feedback.

15. The computer system of claim 10, wherein the computer readable storage medium further stores instructions to modify the label data based on the user feedback, wherein the semi-supervised machine learning process performed in response to the receiving of the user feedback is based on the label data modified based on the user feedback.

16. The computer system of claim 15, wherein the user feedback comprises a first command to apply a first label to a first individual represented in the visualization data or a second command to remove the first label from the first individual.

17. The computer system of claim 10, wherein the computer readable storage medium further stores instructions to:
perform a clustering algorithm based on the semi-supervised machine learning process to determine clusters of individuals of the plurality of individuals; and
modify the label data associated with a first individual based on a distance between the first individual and a first cluster of individuals.

18. The computer system of claim 10, wherein the transaction data comprises image recognition data or speech recognition data.

19. The method of claim 1, wherein the transaction data comprises credit or debit card transaction data.

20. The computer system of claim 10, wherein the transaction data comprises financial transaction data.

* * * * *